United States Patent
Paulus et al.

[19]

[11] Patent Number: 6,004,044
[45] Date of Patent: *Dec. 21, 1999

[54] OPTOELECTRIC CONNECTOR

[75] Inventors: Eric James Paulus, Scottsdale; Scott Allen Zehrung, New River, both of Ariz.

[73] Assignee: ITT Cannon, Inc., Santa Ana, Calif.

[*] Notice: This patent is subject to a terminal disclaimer.

[21] Appl. No.: 08/433,142

[22] Filed: May 3, 1995

[51] Int. Cl.$^6$ .................................................. G02B 6/26
[52] U.S. Cl. ................................. 385/88; 385/92; 385/89
[58] Field of Search ............................... 385/92, 88, 89, 385/70, 71, 66, 35

[56] References Cited

U.S. PATENT DOCUMENTS

| | | |
|---|---|---|
| 3,790,791 | 2/1974 | Anderson . |
| 3,809,908 | 5/1974 | Clanton . |
| 3,878,397 | 4/1975 | Robb . |
| 4,166,668 | 9/1979 | MacLeod ................................. 385/88 |
| 4,199,222 | 4/1980 | Ikushima et al. ........................ 385/92 |
| 4,427,879 | 1/1984 | Becher . |
| 4,678,264 | 7/1987 | Bowen . |
| 4,772,081 | 9/1988 | Borgos et al. ............................ 385/92 |
| 4,798,441 | 1/1989 | Clark . |
| 4,802,725 | 2/1989 | Borne . |
| 4,840,451 | 6/1989 | Sampson . |
| 4,944,568 | 7/1990 | Danbach . |
| 4,954,794 | 9/1990 | Nieman . |
| 4,989,930 | 2/1991 | Nakagawa et al. ...................... 385/35 |
| 4,993,803 | 2/1991 | Suverison . |
| 5,257,949 | 11/1993 | Paulus . |
| 5,315,680 | 5/1994 | Musk et al. .............................. 385/88 |

FOREIGN PATENT DOCUMENTS

| | | |
|---|---|---|
| 0148211 | 6/1988 | Japan . |
| 1-59206 | 3/1989 | Japan ...................................... 385/92 |
| 2106662 | 4/1983 | United Kingdom . |

*Primary Examiner*—Rodney B. Bovernick
*Assistant Examiner*—Yisun Song
*Attorney, Agent, or Firm*—Thomas L. Peterson

[57] ABSTRACT

An optoelectric connector (12, FIG. 2) is described, which has an outer end (96) constructed to efficiently couple to an optical fiber connector (14) and which has an inner end (47) with electrical contacts (46) for passing currents representing modulated light received or transmitted to an optical cable (20) attached to the optical connector. The optoelectric connector (12) includes a stub (80) or short length of optical fiber with an outer end (82) held at a coupling that couples to the optical fiber (24) of the cable in the same manner as a pair of long optical fibers are connected to minimize losses. The stub has an inner end (84) optically coupled to the optic face (42) of a photoelectric transducer (40) which is coupled to an electrical contact (46). The outer end (82) of the stub is preferably movable slightly to enable facewise contact with the end of a mating optical cable fiber (24), and the stub has a middle (102) that extends in a curve to enable its outer end to move slightly while its inner end remains fixed in position.

5 Claims, 2 Drawing Sheets

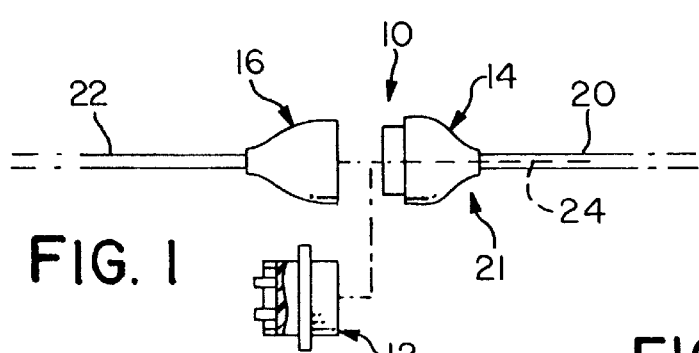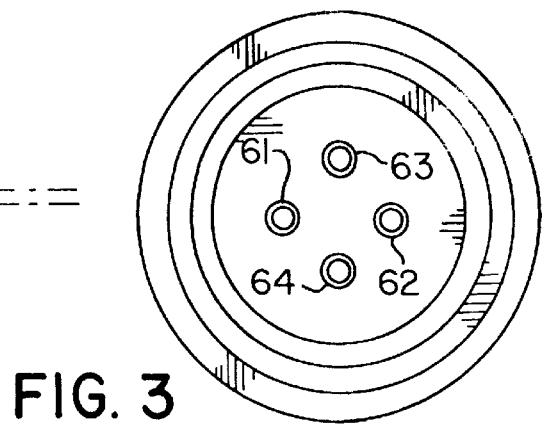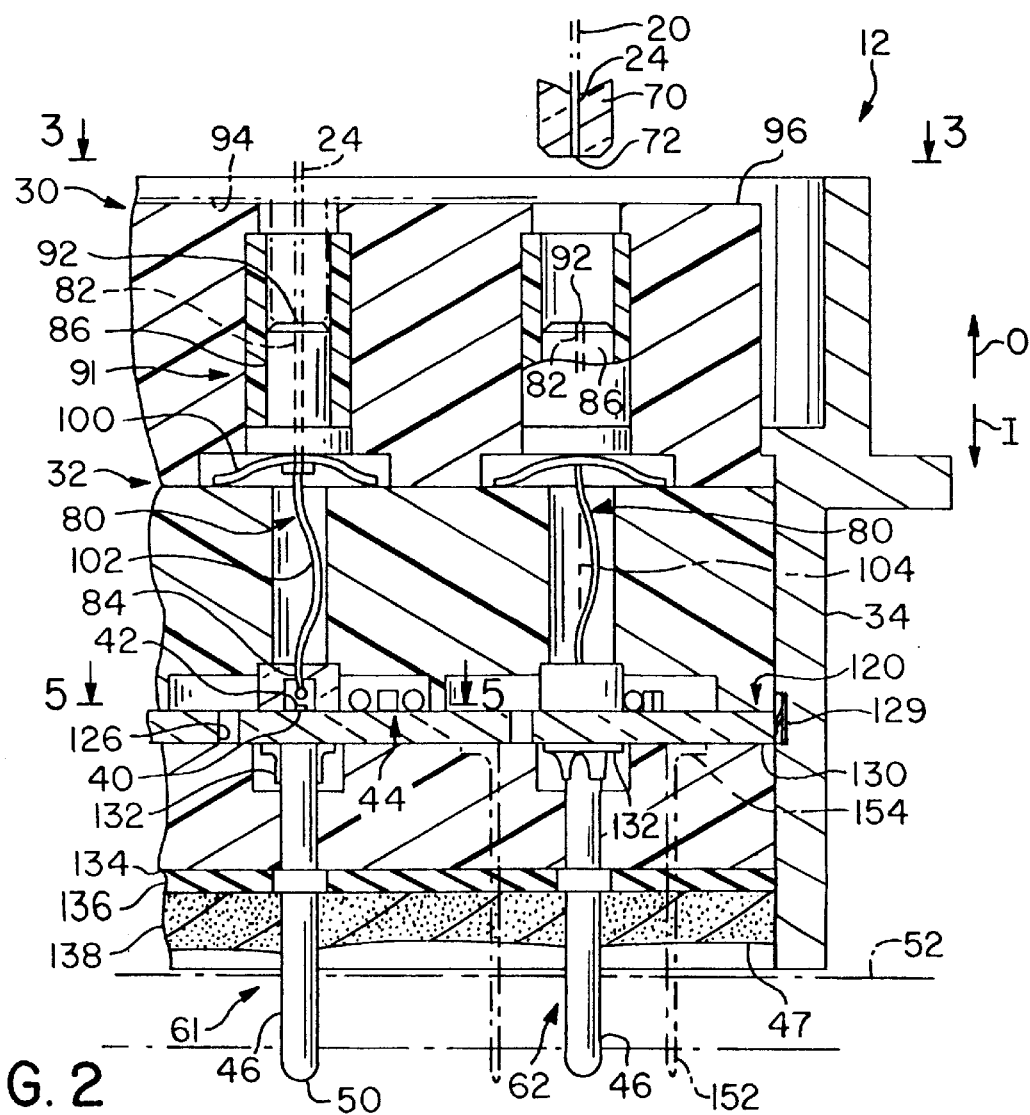

OPTOELECTRIC CONNECTOR

BACKGROUND OF THE INVENTION

Many connectors are available for connecting two long optical cables together, in a manner that assures that a high proportion of light is transmitted between the optical fibers of the cables. A highly efficient coupling method involves polishing the tips of the optical fibers so they are smooth and flat, and positioning the tips in facewise contact (or very close). Since optical fibers are of small width such as several thousandths inch in diameter, the mating tips of two fibers are often held in alignment by mounting each fiber end in a ferrule and holding the ferrules in a sleeve.

There are many applications where a photoelectric transducer is used to detect the modulation of light passing through an optical fiber, and to generate electrical currents representing the modulation. Also, such transducers are used to convert electrical signals to light for transmission along an optical fiber. It is possible to merely place a transducer on a connector so it will lie close to the tip of an optical fiber on a mating optical connector. However, since the mating optical connector is often constructed for connecting to another optical connector, only a small proportion of the light from the mating optical fiber may reach the transducer. Also, if the transducer is intended to generate light for passage along a fiber of a long mating optical cable, then the poor optical coupling may result in very low light levels along the mating optical cable. An optoelectric connector which efficiently detected and transmitted light to and from an optical fiber on a mating optical connector would be of value.

It is common to have the light passing through an optical fiber carry high frequency signals by modulation of the light. When such high frequency signals are carried between a photoelectric transducer and electrical contacts of the optoelectric connector, there is a possibility that electromagnetic interference in the environment of the connector will generate noise that will affect circuitry designed to receive the high frequency electrical signals. It would be desirable if such noise could be minimized.

SUMMARY OF THE INVENTION

In accordance with one embodiment of the present invention, an optoelectric connector is provided which efficiently connects a photoelectric transducer to a mating optical fiber on an optical fiber connector. The optoelectric connector includes an optical fiber stub formed of a short length of optical fiber which has inner and outer ends. The stub inner end is optically coupled to a face of a transducer to transfer light between them. The stub outer end is received in a coupling which is constructed to receive the end of an optical fiber of a mating long optical cable, to efficiently couple them so a high proportion of light is transferred between them. By the use of the optical fiber stub with an outer end that can be efficiently coupled to a mating optical fiber and an inner end designed to efficiently couple to a transducer, applicant obtains efficient light coupling.

The optical fiber stub has opposite ends with different couplings, with the outer end constructed for effective coupling to another optical fiber and with the inner end constructed for efficient coupling to a transducer. The outer end is slidably mounted in a coupling to enable substantial abutment to a mating optical fiber. The optical fiber stub extends in a half sinusoidal curve between its opposite ends, to enable slight movement of the outer end while maintaining the inner end fixed in position. A filter couples the transducer to an electrical contact, to filter out electromagnetic interference.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded side view of a connection system which includes a pair of mateable optical fiber connectors, and an optoelectric connector of the present invention that is designed to mate with one of the optical fiber connector.

FIG. 2 is a sectional view of the optoelectric connector of FIG. 1.

FIG. 3 is a view taken on the line 3—3 of FIG. 2.

DESCRIPTION OF THE PREFERRED EMBODIMENTS

Figure 5:
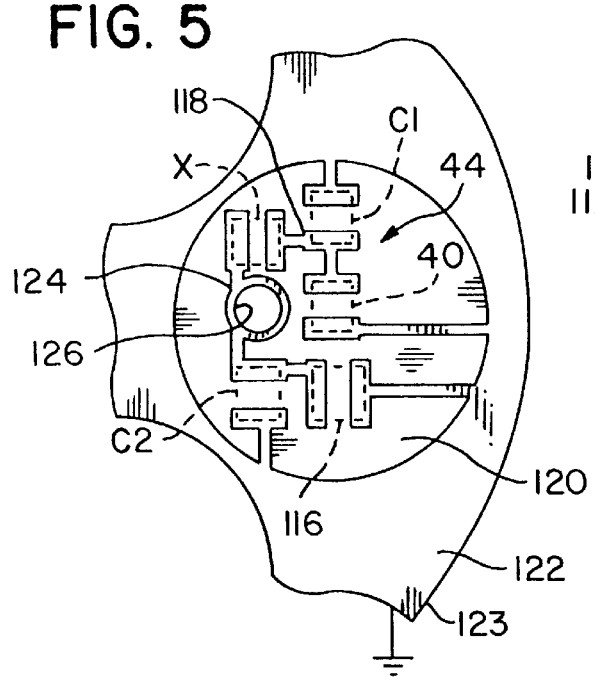
FIG. 5 is a view taken on the line 5—5 of FIG. 2.

FIG. 1 illustrates a connection system 10 which includes a first or optoelectric connector 12 and a pair of optical fiber connectors 14, 16. Each optical fiber connector is attached to a long optical cable 20, 22 which is almost always more than a meter in length, and which may have a length of many kilometers. The combination of connector 14 and cable 20 may be termed a connector-cable assembly 21. Each cable includes a cable optical fiber 24, which commonly has a very small diameter such as about 0.005 inch. The fiber is commonly surrounded by a buffer and jacket which serve to protect the thin optical fiber. It is common to grind and polish the tip of each optical fiber and use parts of high precision to hold the tips of the optical fibers precisely concentric and with their tips either abutting or very close, in order to transfer a high proportion of light between them. Applicant constructs the optical connector 12 so it can be readily connected to one of the optical fiber connectors such as 14.

FIG. 2 shows details of the optoelectric connector 12. The connector includes a housing 30 having insulation 32 and a grounded metal shell 34 around the insulation, and the connector also includes optoelectric assemblies such as 61, 62. Each optoelectric assembly includes a photoelectric transducer 40 which has an optic face 42 designed to receive light. The transducer converts the light into electrical current, either by using the energy of the light to create current or by using the light to change the resistance or other electrical characteristic of the transducer. Current through the transducer passes through a filter circuit 44 and through an electrical contact 46 at the inner end 47 of the connector. The electrical contact 46 has an inner end 50 which is exposed to connect to other circuitry. FIG. 2 indicates, in phantom lines, an external circuit board 52 which has signal processing circuitry, which may include an amplifier, modulator/demodulator, etc. to process electrical currents received from the contact 46 and/or to generate electrical currents to deliver to the contact 46 to energize the transducer 40. The particular optoelectric connector is shown as having four optoelectric assemblies 61–64, although one or any number can be used.

The mating optical fiber connector 14 includes a ferrule 70 in which the cable optical fiber 24 is mounted, with the tip 72 of its fiber being even, or flush, with the tip of the ferrule. It would be possible to construct the optoelectric connector 12 so it received the ferrule 70 with the tip 72 of the optical fiber positioned close to the optic face 42 of the transducer 40. However, the transducer 40 has a face of much larger width than the width of the optical fiber 24. As a result, light from the fiber 24 would not be distributed over a substantial area of the transducer 40, so that only a very weak current would be produced by the transducer for moderate amplitude light in the optical fiber 24. Also, where the transducer 40 is designed to generate light that is to travel through the fiber 24, very little light generated by the transducer 40 would find its way into the fiber 24.

In accordance with the present invention, applicant provides an optical fiber stub 80 with an outer stub end 82 that is designed to efficiently couple to the optical fiber 24, and which has an inner stub end 84 that is designed to efficiently couple to the transducer 40. The optical fiber stub 80 comprises a short length of optical fiber (with or without a buffer), which may be similar or identical to the optical fiber 24, but which has a much shorter length. While the optical fiber 24 generally has a length of more than one meter and usually much more than that, the stub 80 has a length of less than one-half meter, and usually much less than that, since the purpose of the stub is to couple the optical fiber 24 to the transducer 40.

The outer stub end 82 is fixed in a ferrule 86, and the ferrule lies very closely within a sleeve 90. The combination forms an optical fiber coupling 91. The sleeve is designed to receive the ferrule 70 of the optical cable 14. When the ferrule 70 is slid all the way in, the tips 72, 92 of the optical fiber 24 and stub 80 abut one another, or lie very close (e.g. within 0.005 inch) to one another. This results in a large proportion of light being transferred between them. The ferrule 70 is designed to move a predetermined distance in an inward direction I, until a surface 94 of the optical fiber connector 14 abuts a corresponding outer surface 96 of the connector housing 30. To assure abutment, the ferrule 86 is able to move slightly in the inward direction I, and is biased in an outward direction O by a spring 100. The inner stub end 84 is fixed in position. To accommodate slight movement of the ferrule 86 and outer stub end 82, the optical fiber stub is provided with a middle portion 102 that extends in a largely sinusoidal curve, preferably half of a complete sine. The middle portion 102 becomes slightly more or less curved, and deviates slightly more or less from an imaginary straight line 104 extending between the stub opposite ends, as the outer stub end 82 moves respectively inward and outward.

Figure 6:
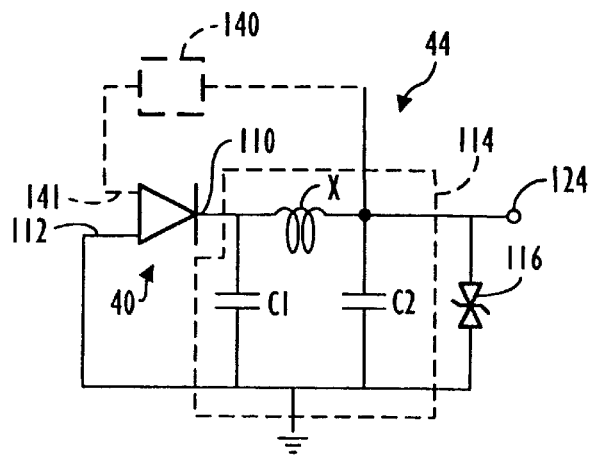
FIG. 6 is a schematic diagram of the filtering circuit of FIG. 5.

The transducer 40 has at least two electrical terminals, with one usually being electrically grounded. It would be possible to directly connect the ungrounded terminal of the transducer 40 directly to the electrical contact 46. However, applicant sometimes prefers to connect the filter circuit 44 between a terminal of the transducer 40 and the electrical contact 46. FIG. 6 is a schematic diagram of the filter circuit 44. The circuit includes the photoelectric transducer 40, which is shown as having only two terminals 110, 112. The terminal 112 is grounded. The other terminal 110 is connected through a first filter portion 114 consisting of a "pi" filter with two capacitors C1 and C2 and an inductor X (or resistor) connecting them as shown. The first filter portion 114 is a low pass filter which passes only signals below a predetermined frequency. This filters out high frequency noise. Another filter portion 116 is a Zener diode, which may be unipolar or bipolar, and which prevents the passage of high voltages that could damage following amplifier or other circuitry. Applicant prefers to place the filter circuit close to the transducer 40 and within the shell 34, so that the optoelectric connector produces a "clean" electrical signal which represents the signal carried by light along the long optical fiber 24.

As shown in FIG. 5, the particular construction includes various traces such as 118 on a ceramic substrate 120. Each of the circuit components such as C1 has surface-mounted terminals that can be soldered to corresponding traces. The ground plane at 122 is a trace that surrounds the other traces and extends on the periphery 123 of the substrate. One of the traces at 124 leads to a plated hole 126, where the plating extends along the walls of the hole and to the inner side 130 (FIG. 2) of the ceramic substrate. A spring contact 129 connects the ground plane to the shell 34. A pinholder 132 is soldered to the trace on the lower face of the substrate, and the electrical contact 46 is soldered to the pinholder 132. An insulator member 134 serves to hold the contact 46 in position. Rubber and epoxy layers 136, 138 help seal the connector. It is noted that FIG. 6 also shows a signal generator 140 connected to a third terminal 141 of the transducer 40 to deliver signals thereto that cause the transducer to emit light to be picked up by the optical fiber stub.

Figure 4:
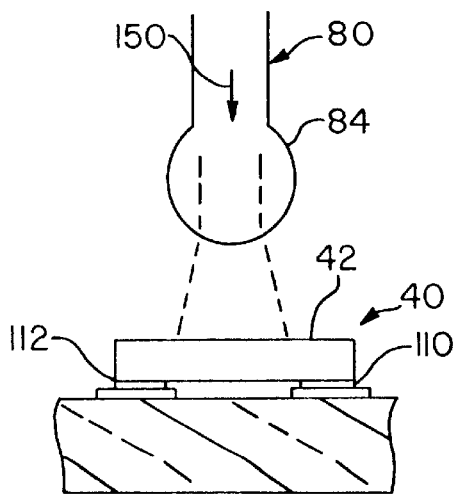
FIG. 4 is an enlarged view of a portion of the connector of FIG. 2.

FIG. 4 shows one coupling arrangement for coupling the stub inner end 84 to the optic face 42 of the transducer 40. The end 84 of the stub has been melted to form a ball at 84. The ball at 84 distributes incoming light 150 over a much wider area than would occur if the end at 84 were merely flat and of the same diameter as the rest of the stub. This is because the area of the optic face 42 is greater than the average cross-sectional area of the stub 80. Similarly, the ball at 84 receives light from a substantial area of the transducer optic face 42 to carry it along the rest of the stub 80 to the stub outer end where it is coupled to the long optical fiber 24. The use of balls such as 84 at the end of an optical fiber has been known to couple a pair of optical fibers, although with less efficiency than with abutting flat tips. However, applicant does not know of any stub (short length of optical fiber) with a ball at one end and a flat tip at the other end to couple a transducer to a long optical fiber.

In many applications where higher frequency signals (hundreds of MHz) are transmitted, a coaxial contact is desirable. As shown in FIG. 2, applicant can provide an outer coaxial contact 152 with its end at 154 soldered to a ground plane that covers the underside of the ceramic substrate 120 (except where a trace connects to a pinholder 132). The provision of a filter circuit enclosed within the shell 34 helps to provide a "clean" signal to the coaxial connector, and can provide a desired characteristic impedance for the coaxial connector.

Figure 7:
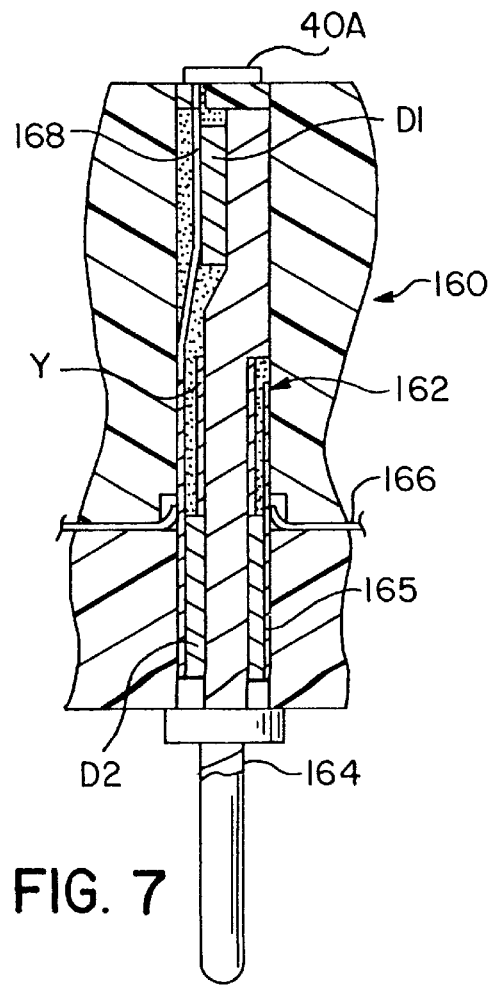
FIG. 7 is a partial sectional view of an optoelectric connector constructed in accordance with another embodiment of the invention.

FIG. 7 shows a portion of another optoelectric connector 160 wherein a filtering circuit 162 is contained on a contact 164. The circuit includes a pair of capacitors D1, D2 and a ferrite bead inductor Y connected as shown in FIG. 6. A grounding sleeve 165 is connected to a grounded plate 166 that extends to the inside of the connector shell to which it is connected. A transducer 40A is mounted on the outer end of the contact, with one terminal connected to the contact 164 and another terminal connected to an extension 168 of the sleeve 165. It is noted that this general arrangement is shown in U.S. Pat. No. 4,954,794.

Thus, the invention provides an optoelectric connector which efficiently couples a photoelectric transducer to the end of an optical fiber of a long optical cable that is held on an optical fiber connector. Such effective coupling is obtained by the use of an optical fiber stub comprising a short length of optical fiber, with an outer end mounted in a coupling that effectively couples to an end of the long optical fiber, and with an inner end that effectively couples to the transducer. The outer end of the optical fiber is preferably ground and polished flat and held in a ferrule that can slide slightly within a sleeve, and with the stub having a middle portion extending in a curve to allow sliding of the stub outer end while the stub inner end is fixed in position. A filter circuit can be provided between the transducer and an electrical contact, or at least the inner end thereof, to provide filtering close to the transducer where signals are generated.

Although particular embodiments of the invention have been described and illustrated herein, it is recognized that modifications and variations may readily occur to those skilled in the art, and consequently, it is intended that the claims be interpreted to cover such modifications and equivalents.

In the claims:

1. An optoelectric connector for connection to an end of a cable optical fiber of an optical cable, comprising:

a housing;

a photoelectric transducer mounted in said housing, said transducer having a plurality of electric terminals and having an optic face, and said transducer being capable of detecting modulated light falling on said optic face and generating an electrical signal corresponding to the modulation of said light;

an optical fiber stub comprising a length of optical fiber material of less than one-half meter length, having a stub inner end optically coupled to said optic face of said transducer to transfer light between them, and having a stub outer end;

an optical fiber coupling mounted in said housing and receiving said stub outer end, said optical fiber coupling being constructed to optically connect said end of said cable optical fiber to said stub outer end to transfer light between them and therefore between said end of said cable optical fiber and said optic face of said transducer;

said optic face having an area that is greater than the average cross-sectional area of said stub, and said stub inner end including means for distributing light onto said optic face.

2. The connector described in claim 1 wherein:

said transducer and said stub inner end are each fixed in position in said housing, said optical fiber coupling includes a sleeve and said stub outer end is slidable within said sleeve and is biased away from said stub inner end, and said stub has a flexible middle portion that is bent so it deviates from an imaginary line connecting said inner and outer ends of said optical fiber stub.

3. The connector described in claim 1 wherein:

said housing includes an outer metal shell and an insulator lying within said shell; and including
   at least one electrical contact mounted in said insulator, said contact having an inner end that is open to the environment outside said housing and having an outer end that lies within said insulation and is surrounded by said shell;
   a filter circuit mounted within said housing shell and connected between one of said transducer terminals and said contact inner end.

4. A method for optically coupling an end of a cable optical fiber of an optical cable that has a length of a plurality of meters, to a photoelectric transducer that detects light and which has an optic face through which light passes and a plurality of electric terminals that carry current, where the transducer is mounted on a connector housing, to cause the transducer to produce a current that is modulated in accordance with the modulation of light that passes through said cable optical fiber and that reaches said optic face of said transducer comprising:

establishing an optical fiber stub comprising a short length of optical fiber material, so an inner end of the stub is efficiently optically coupled to said optic face of said transducer to direct a maximum amount of light passing through said stub toward said transducer, onto said optic face of said transducer, and so an outer end of the stub is efficiently coupled to said cable optical fiber.

5. An optoelectric connector, comprising:

a housing;

a photoelectric transducer mounted in said housing, said transducer having a plurality of electric terminals and having an optic face, and said transducer being capable of detecting modulated light falling on said optic face and generating an electrical signal corresponding to the modulation of said light;

an optical fiber stub comprising a length of optical fiber material of no more than one-half meter length, having a stub outer end and a stub inner end, said stub inner end being optically coupled to said optic face of said transducer to direct a maximum amount of light passing through the stub toward the transducer.

* * * * *